E. FRANK & J. KISSLING.
ICE-CREAM FREEZER.

No. 187,612. Patented Feb. 20, 1877.

Attest:
C. A. Snow.
Fred G. Dieterich

Inventors:
E. Frank & J. Kissling
by Louis Bagger & Co.
Attys.

UNITED STATES PATENT OFFICE.

EMIL FRANK AND JOHN KISSLING, OF RAHWAY, NEW JERSEY.

IMPROVEMENT IN ICE-CREAM FREEZERS.

Specification forming part of Letters Patent No. 187,652, dated February 20, 1877; application filed September 8, 1876.

*To all whom it may concern:*

Be it known that we, EMIL FRANK and JOHN KISSLING, of Rahway, in the county of Union and State of New Jersey, have invented certain new and useful Improvements in Ice-Cream Freezers; and we do hereby declare that the following is a full, clear, and exact description thereof, which will enable others skilled in the art to which it appertains to make and use the same, reference being had to the accompanying drawing, which forms a part of this specification, and in which—

Figure 1:
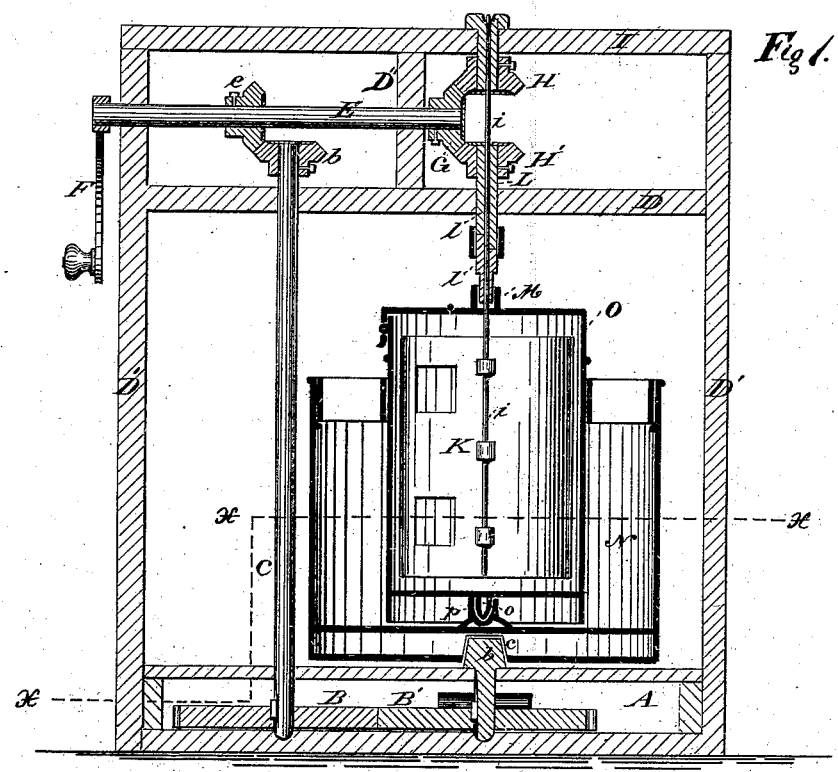
Figure 2:
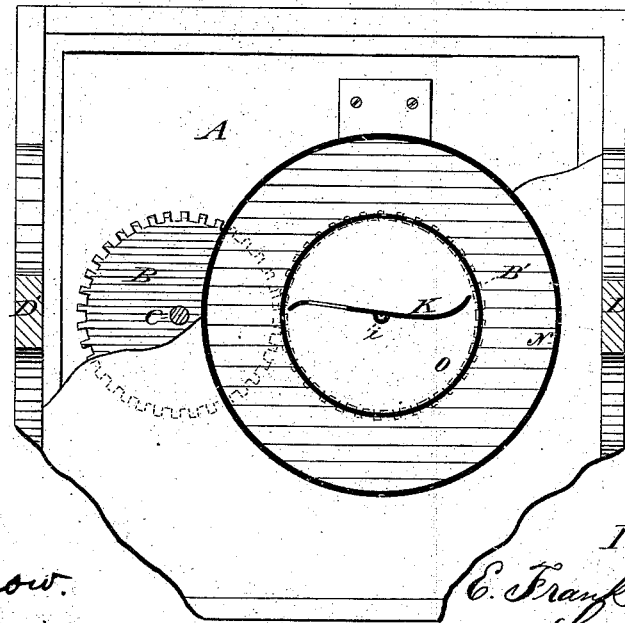

Figure 1 is a vertical section, and Fig. 2 is a cross-section after the line $x\,x$ in Fig. 1.

Similar letters of reference indicate corresponding parts in both figures.

This invention relates to ice-cream freezers; and it consists in the construction and combination of parts by which the ice-tub and the cream-tub are made to revolve in opposite directions, while at the same time the dasher is made to revolve within the cream-tub, thus causing the cream to be thoroughly stirred, in the manner and for the purpose hereinafter more fully shown and specified.

In the drawing, A is a flat, square box, within which are arranged two horizontally-revolving pinions, B B'. From one of these pinions, B, a shaft, C, extends upward, passing through a cross-brace, D, of the vertical standards D' D', above which it has a small pinion, $b$, engaging with a similar one, $e$, on a horizontal shaft, E, arranged, as shown, between the cross-braces D' D''. Shaft E is operated by a crank, F. Upon the end of shaft E is arranged a pinion, G, operating two similar pinions, H H', which are thus made to revolve in opposite directions. Pinion H is geared in the top brace I of the frame, and it operates a vertical rod, $i$, which passes downward through the cream-tub, where it operates the dasher K, which is adjusted upon it in any suitable manner. The pinion H' operates a downward-projecting shaft, L, made of two pieces, $l\,l$, coupled together in such a manner that the lower part thereof can be removed when desirable. The lower portion of shaft L is stepped into a square mortise, M, in the top of the cream-tub, which is thus revolved when shaft L is operated. The rod $i$ passes through a central perforation in the shaft L, within which it is thus made to revolve. The pinion or cog-wheel B' in box A has an upward projection, $b$, fitting into a corresponding mortise, $c$, in the bottom of the ice-tub N, which is thus operated by the revolution of the pinion B'. The cream-tub O has in the bottom a pivot, $o$, working in a bearing, $p$, in the inside of the ice-tub, within which it may thus freely revolve.

The operation of our improved ice-cream freezer is as follows: After placing the necessary ingredients in the cream-tub, and filling the ice-tub N with ice, the crank F is operated, the effect of which is to rotate the dasher, which, in the drawing, is indicated by the letter K, and the ice-tub N in the same direction, (indicated by the arrow in the drawing,) while the cream-tub O is made to rotate in the opposite direction, thus causing the contents of the cream-tub to be thoroughly stirred while at the same time it is frozen by the ice contained in the ice-tub. After the cream is frozen the cream-tub may be taken out by removing the rod $i$ and uncoupling the shaft L. The dasher may then be removed and the cream emptied out, and the tub cleaned before replacing.

Having thus described our invention, we claim and desire to secure by Letters Patent of the United States—

1. The combination of the perforated coupled shaft L, shaft or rod $i$, pinions H H', dasher K, cream-tub O, ice-tub N, and pinion B', all constructed substantially in the manner and for the purpose herein shown and specified.

2. In an ice-cream freezer, the combination of the revolving ice-tub N, revolving cream-tub O, and revolving dasher K, substantially as and for the purpose hereinbefore set forth.

3. In combination with the ice-tub N, cream-tub O, dasher K, perforated shaft L, and rod $i$, the gearing B B' C $b$ $e$ E G H H', and crank F, substantially as and for the purpose herein shown and specified.

In testimony that we claim the foregoing as our own we have hereto affixed our signatures in presence of two witnesses.

EMIL FRANK.
JOHN KISSLING.

Witnesses:
JAMES H. DURAND,
JOHN KISSLING, Jr.